United States Patent [19]

Daunt et al.

[11] Patent Number: 5,018,163
[45] Date of Patent: May 21, 1991

[54] GATLING GUN LASER PULSE AMPLIFIER USING AN OPTICAL DIODE

[75] Inventors: Geraldine H. Daunt, Arlington, Va.; Richard A. Utano, Winterpark, Fla.; Suresh Chandra, Falls Church, Va.

[73] Assignee: The United States of America as represented by the Secretary of the Army, Washington, D.C.

[21] Appl. No.: 515,139

[22] Filed: Apr. 26, 1990

[51] Int. Cl.$^5$ .............................................. H01S 3/07
[52] U.S. Cl. ...................................... 372/68; 372/108; 372/105; 372/106; 372/97
[58] Field of Search ................ 372/25, 703, 105, 106, 372/108, 99, 68, 97

[56] References Cited

U.S. PATENT DOCUMENTS

| | | | |
|---|---|---|---|
| 3,699,474 | 10/1972 | Landry | 372/105 |
| 3,736,526 | 5/1973 | Simmons | 372/97 |
| 3,924,937 | 12/1975 | Munroe et al. | 372/97 |
| 4,194,168 | 3/1980 | Jarrett et al. | 372/105 |
| 4,682,340 | 7/1987 | Dave et al. | 372/105 |
| 4,709,368 | 11/1987 | Fukuda et al. | 372/97 |
| 4,737,958 | 4/1988 | Sizer, II | 372/25 |

*Primary Examiner*—Frank Gonzalez
*Assistant Examiner*—Susan S. Morse
*Attorney, Agent, or Firm*—Milton W. Lee; Anthony T. Lane

[57] ABSTRACT

A laser oscillator system which transmits laser input beam pulses through an optical diode and into a plurality of time-multiplexed phase conjugate amplifier which sequentially amplify in chronological order subsequent input beam pulses. The optical diode is positioned on the oscillator laser beam pulse axis and is comprised of a polarizer, a half-wave plate which rotates the pulse polarity by 45° in one direction and a Faraday rotator which rotates the pulse polarity 45° in the opposite direction. A plurality of grouped Pockels cells and polarizers are positioned on the oscillator axis past the Faraday rotator. The polarizers route the input beam pulse toward a phase conjugate amplifier when a half-wave voltage is applied to the Pockels cell. Each phase conjugate amplifier has a phase conjugate mirror, at its output for retroreflecting the once amplified input laser beam pulse back therethrough for a second amplification. The twice amplified laser beam pulse is returned back to and reflected off the beam splitter back through the Pockels cell. The pockels cell rotates the pusle back to its orignal polarity as the pulse returns to the optical diode. Teh faraday rotator rotates the pulse 45° and the half-wave plate rotates the pulse another 45° for a total of 90°. The 90° rotated amplified output pulses from the time multiplexed amplifiers are reflected off the polarizer and out the laser system.

4 Claims, 2 Drawing Sheets

GATLING GUN LASER PULSE AMPLIFIER USING AN OPTICAL DIODE

GATLING GUN LASER PULSE AMPLIFIER USING AN OPTICAL DIODE

The invention described herein may be manufactured, used, and licensed by the U.S. Government for governmental purposes without the payment of any royalties thereon.

BACKGROUND OF INVENTION

1. Field

The invention is in the field of high brightness laser systems which use a low energy master oscillator laser beam and a power amplifier usually limited to a low pulse repetition rate, and specifically to the time-multiplexing of a plurality of phase conjugated power amplifiers in which the oscillator laser beam pulses pass through an optical diode comprised of a polarizer, a half-wave plate, and a Faraday rotator and wherein a plurality of Pockels cells are electronically sequentially switched to divert successive oscillator pulses to sequential amplifiers in a Gatling gun fashion of firing the amplifiers and out the optical diode to provide a high pulse repetition rate for the laser system.

2. Prior Art

Known high brightness lasers which use solid state lasers as power amplifiers in a laser oscillator system are usually pulse rate limited by the thermal effects in the power amplifier laser rods. The pulse repetition frequency may be limited to about 60 Hertz. A laser system which is limited in frequency is a laser oscillator and a solid state laser rod phase conjugated power amplifier with a polarizer in optical alignment therebetween for routing the oscillator laser beam pulses into the phase conjugated power amplifier and the retroreflected amplified output laser beam pulses out of the laser system toward a target. The phase conjugated power amplifier has at the back side a quarter-wave plate and a phase conjugate mirror, comprised of a focusing lens and a stimulated Brillouin scattering cell, for retroreflecting the once amplified beam back. The retroreflected beam is amplified a second time then on the pass back through the power amplifier. The two passes through the quarter-wave plate result in the beam polarization to rotate by 90°. The twice amplified output beam pulse is reflected off the polarizer.

The stimulated Brillouin scattering of the laser beam pulses results in a phase conjugated and distortion free retroreturn of the input laser beam pulse even when the amplifier has some slight movement or misalignment. Such a laser system has high-fidelity amplification and a stable output beam direction. The frequency of producing laser pulses therefrom is however limited by the temperature generated in the laser rods of the power amplifiers.

The present invention provides an increased pulse repetition frequency by switching a plurality of phase conjugate amplifiers sequentially in sychronism with the oscillator laser beam pulses so that no amplifier is overloaded. The amplifiers are the solid state laser rod type with each having an input thereto along an optical axis of a laser oscillator and an output therefrom to a phase conjugate mirror which retroflects the pulse back through the quarter-wave plate. The phase conjugate mirror is comprised of a focusing lens and a stimulated Brillouin scattering cell. The amplifiers are selectively time multiplexed sequentially with the input beam pulses so that each individual amplifier unit operates at a frequency below the critical overheating level, which may be at about 60 Hertz. By use of the stimulated Brillouin scattering cell for retroreflection, the outputs from each amplifier is automatically and stably aligned with the outputs of the other amplifiers.

A similar patent application is concurrently filed, titled "Gatling Gun Laser Amplifier Using Rotating Mirrors" by co-inventors Suresh Chandra and Geraldine Daunt. The other application is however distinctly different from the present invention.

SUMMARY OF THE INVENTION

The invention is comprised of a laser system having an oscillator which transmits input beam pulses along the system optical axis through an optical diode, formed by a polarizer, a half-wave plate, and a Faraday rotator, to a plurality of Pockels cells and polarizers which are associated with a plurality of phase conjugated amplifiers. The phase conjugated amplifiers are selectively time-multiplexed by applying half-wave voltages at the Pockels Cells associated with the amplifier. When the half-wave voltages are applied at the Pockels cell the input beam pulse at that instance is directed by the associated polarizers into the phase conjugated amplifier. The input beam pulses is amplified as it passes through the amplifier and is retroflected by a phase conjugate mirror. The phase conjugate mirror is preferably comprised of a focusing lens and a stimulated Brillouin scattered cell. The beam pulse returns back through the amplifier and is amplified a second time and is reflected off the polarizers back to the optical diode exactly back upon itself. The optical diode provides the exit for all of the twice amplified beam pulses from all of the plurality of phase conjugate amplifiers in a Gatling gun type firing order distribution of firing the amplifiers according to the time-multiplexing of the Pockels cells.

The optical diode linearly polarizes each of the input beam pulses toward the amplifiers at the polarizer, rotates the linearly polarized pulses in one direction, say counter clockwise, through a 45° by the half-wave plate and rotates the pulses through 45° in the other direction, i.e. clockwise, by the Faraday rotator. Each of the output beam pulses from the amplifiers are rotated by the same 45° angle again in the one direction by the Faraday rotator and by the same 45° angle in the same direction by the half-wave plate. The output beam is thus rotated by the Faraday rotator and a half-wave plate combination through a 90° angle total. The output beam pulse is thus rotated 90° from the input beam pulse and is reflected off the output side of the polarizer and out the laser system.

The invention will be better understood with reference to the detailed description in view of the drawings.

DETAILED DESCRIPTION OF THE PREFERRED EMBODIMENT

Figure 1:
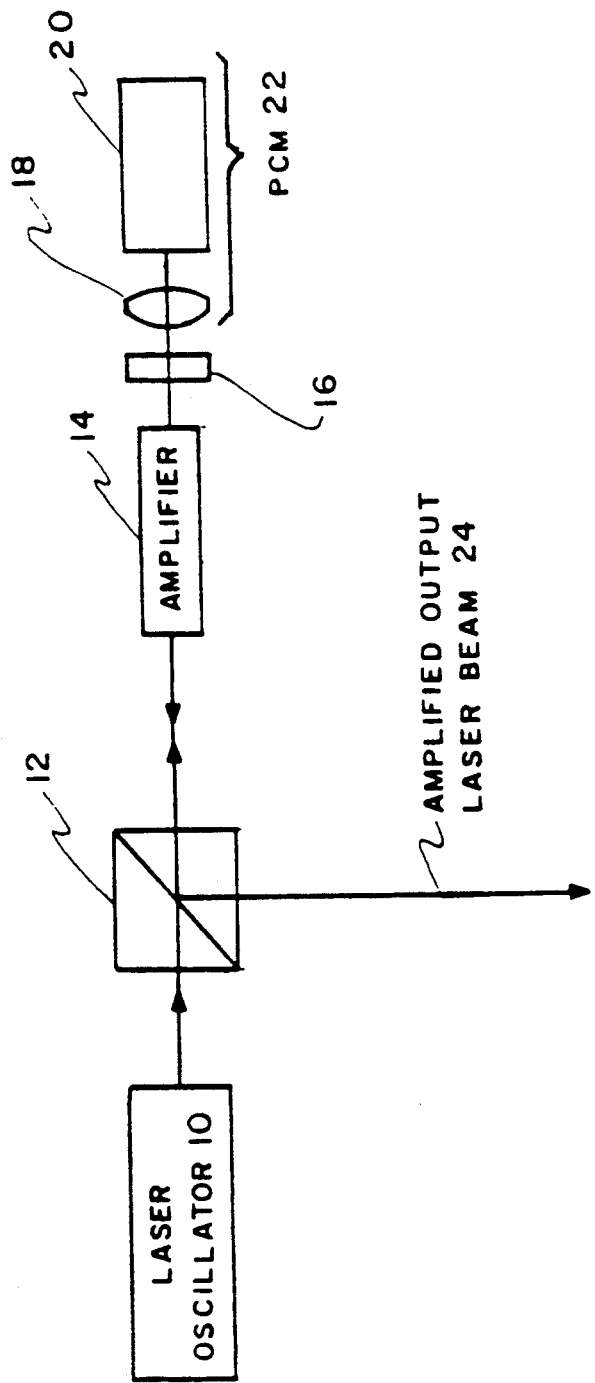
FIG. 1 illustrates schematically a prior art phase conjugate amplifier.

Refer to FIG. 1 for an illustration of a single phase conjugate amplifier which has previously been used to twice amplify and retroflect laser beam pulses from a laser system. The prior art will be briefly discussed to illustrate its function and how it is used in the combination of the present invention. A laser oscillator 10 transmits a train of laser beam pulses therefrom which passes directly through a polarizer 12 as linearly polarized input laser beam pulses into a laser amplifier 14. The linearly polarized pulses are amplified by 14 as they pass therethrough and are made circularly polarized by quarter-wave plate 16 before entering a phase conjugate mirror 22. The phase conjugate mirror is comprised of a focusing lens 18 and a stimulated Brillouin scattering cell 20. Cell 20 provides retroreflection for the pulses. The retroreflected pulse, upon passing back through the quarter-wave plate 16 become linearly polarized but rotated 90° in polarization from the original direction. The amplifier 14 amplifies the rotated 90° polarization pulse a second time as the pulse passes back through 14. The twice amplified output pulse from 14 is reflected off the polarizer 12 and toward some target as an amplified output laser beam pulse 24.

Figure 2:
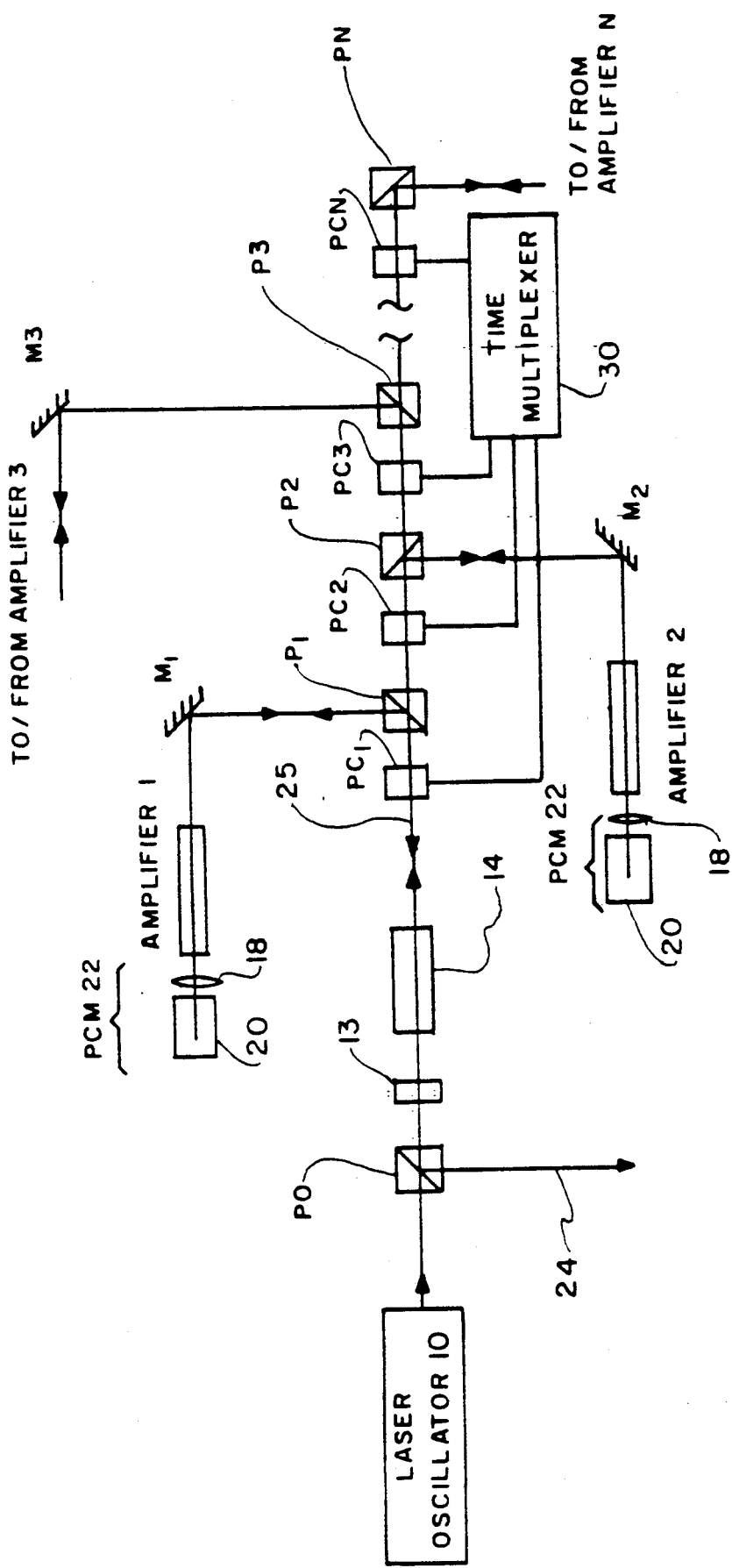
FIG. 2 is a schematic illustration of the present time-multiplexed laser system using an optical diode.

Refer now to FIG. 2 on how the present invention provides a laser system selectively having a much higher pulse repetition pulse frequency than this prior art system. The present laser system may use a plurality of similar solid state single phase conjugate laser amplifiers and retroreflectors as the above noted prior art, along with an optical diode, comprised of the polarizer PO, a half-wave plate 13, and a Faraday rotator 14. A Pockels cell and polarizer associated with each amplifier are positioned along the laser system optical axis 25 between the Faraday rotator 14 and each of a plurality of the above noted solid state amplifiers. The amplifiers are numbered sequentially through N, with N representing the total number of the plurality of amplifiers. The amplifiers may be an offset folded optical path from axis 25 folded by fixed reflecting mirrors M1, M2, M3, -MN, respectively from the polarizers P1, P2, P3-PN, or the optical paths may be directly through the polarizers to the amplifiers. It is noted that the laser oscillator and amplifiers should be made of the same material. The laser materials may be gaseous, liquid, or solid state. A good solid state laser oscillator and amplifiers may be a neodymium: yttrium aluminum garnet lasers.

The number of the single phase conjugate amplifiers that may be used in the laser system is generally limited by the laser power that can be handled by the Faraday rotator 14. It is well within the possibility that twenty of the single phase conjugate amplifiers may be used with the oscillator 10 transmitting at 1 kilo Hertz. Each of the twenty amplifiers would then be sequentially switched on to operate at 50 Hertz each and thus produce the desired pulse repetition frequency of 1 kilo Hertz.

The invention is now explained by the following examples to show how the laser system can increase the amplified pulse repetition frequency of output laser pulses without overheating any of the amplifiers. The laser oscillator 10 is set to transmit laser beam pulses therefrom at 200 Hertz. There are ten single phase conjugate solid state amplifiers used, with each amplifier being time-multiplexed to amplify every tenth input laser beam pulse from oscillator 10, and thus each amplifier operates at 20 Hertz. Each input beam pulse of the plurality of pulses at a rate of 200 Hertz from 10 passes through polarizer PO as a linearly polarized pulse and is rotated in one direction, say counter clockwise, 45° by a half-wave plate 13 and is rotated in the opposite direction i.e. clockwise, 45° by a Faraday rotator 14. The linearly polarized pulse remains polarized in the same direction from 14 along the laser optical axis 25 and will pass through the Pockets cell PC1 through PC10 and polarizers P1 through P10 if a switching voltage from time multiplexer 30 is not applied to any of the Pockels cells. When voltages are sequentially applied to PC1 through PC10, every tenth pulse is amplified by each of the amplifiers 1 throgh 10 respectively associated with the paired PC1 and P1 through PC10 and P10. Stated another way, amplifier 1 receives and amplifies pulses 1, 11, 21 ,-, through 191 and amplifier 2 receives pulses 2, 12, 22, -, through 192 etc through all of the 200 pulses.

The sequential switching is as follows: when input beam pulse 1 is transmitted from oscillator 10 the time multiplexer 30 applies voltage only at PC1 so that the linearly polarized pulse 1, say vertical polarized, is switched by PC1 to a horizontally polarized pulse 1. Pulse 1 is reflected off BS1 and fixed mirror M1 and through amplifier 1, wherein pulse 1 is amplified. The amplified horizontally polarized pulse 1 is retroreflected from the phase conjugate mirror 22, comprised of focusing lens 18 and stimulated Brillouin scattering cell 20, back through amplifier 1 in which pulse 1 is now twice amplified. The twice amplified output pulse is reflected off P1 and back through PC1 for rotation of pulse 1 from being horizontally polarized back to being vertically polarized. The twice amplified vertically polarized pulse 1 passes through the Faraday rotator 14 and the half-wave plate and is rotated by 45° in each of 14 and 13 in the same direction for a total of 90° rotation. The return output beam pulse is then reflected off PO as the amplified first output beam laser pulse 24.

Next pick up and trace the second pulse of the two hundred pulses from oscillator 10 through the laser system. In this case only PC2 has the half-wave voltage from 30 applied thereto. Thus, the vertically polarized laser beam pulse from the Faraday rotator 14 passes through the inactive PC1, and the polarizer P1, but is converted to a horizontally polarized laser beam pulse PC2. The horizontally polarized second pulse is reflected of beam splitter P2 and fixed mirror M2 through amplifier 2, and is retroflected as the same horizontally polarized light from PCM22 back through amplifier 2 and off M2 and P2 along the optical axis 25 and is rotated by 14 and 13 and reflected off the back of polarizer PO as the second output beam laser pulse 24.

The same procedure is repeated cyclically through each individual amplifier and is then repeated. It is to be understood that only one of the Pockels cells PC1 through PC10 are activated at the instant when one of the input laser beam pulses is received from 10 through the optical diode comprised of elements PO, 13, and 14.

We claim:

1. A laser system for providing high power pulse repetition frequency laser output beam pulses, said system comprised of:
   a laser oscillator which produces a high quality reference wavefront of low energy laser beam pulses which are fired at a pulse repetition frequency of said laser system;
   a plurality of phase conjugate amplifiers comprised of a plurality of laser amplifiers having phase conjugate mirrors at one end thereof;
   an optical diode positioned on the oscillator axis for initially receiving said laser beam pulses, said optical diode comprised of a polarizer for linearly polarizing said laser beam pulses a half-wave plate for rotating each of the laser input beam pulses in one direction, and a Faraday rotator which rotates each of the laser input beam pulses in the opposite direction from rotation by said half-wave plate;

a plurality of Pockels cells and polarizers, each of said plurality of Pockels cells and polarizes associated with a phase conjugate amplifier of said plurality of phase conjugate amplifiers wherein said plurality of Pockels cells and polarizers are positioned along said oscillator axis between said Faraday rotator and each of the associated plurality of phase conjugate amplifiers which are positioned in separate offset folded optical paths from said oscillator axis; and a time-multiplexer means which sequentially applies a half-wave voltage to each of said plurality of Pockels cells in synchronism with each of said low energy laser beam pulses produced by said oscillator wherein each Pockels cell rotates each of said laser beam pulses through 90° an in input beam pulse to said amplifier at a pulse repetition frequency of said laser system wherein said polarizer routes the input laser beam pulse toward said phase conjugate amplifier associated therewith in which said input beam pulse is once amplified as it passes through the amplifier and is retroreflected by said phase conjugate mirror back through said amplifier to be amplified a second time to form an amplified output beam pulse which is reflected off said polarizer is passed through and is rotated by said Pockels cell back through 90° wherein said output beam pulse is rotated to be polarized in the same direction as the input laser beam pulse upon passing back through said Faraday rotator and said half-wave plate wherein said output beam pulse undergoes a net polarization rotation of 90° in which the amplified output beam pulse is reflected off said polarizer and out of said laser system.

2. A laser system as set forth in claim 1 wherein said laser oscillator and said plurality of laser amplifiers are made of the same material.

3. A laser system as set forth in claim 2 wherein said laser oscillator and said plurality of laser amplifiers are made of solid state laser materials.

4. A laser system as set forth in claim 1 wherein said plurality of phase conjugate amplifiers is in the range from 10 to 20 and the pulse repetition frequency of said laser oscillator is in the range from 500 Hertz to 1 kilo Hertz.

* * * * *